United States Patent Office 3,097,860
Patented July 16, 1963

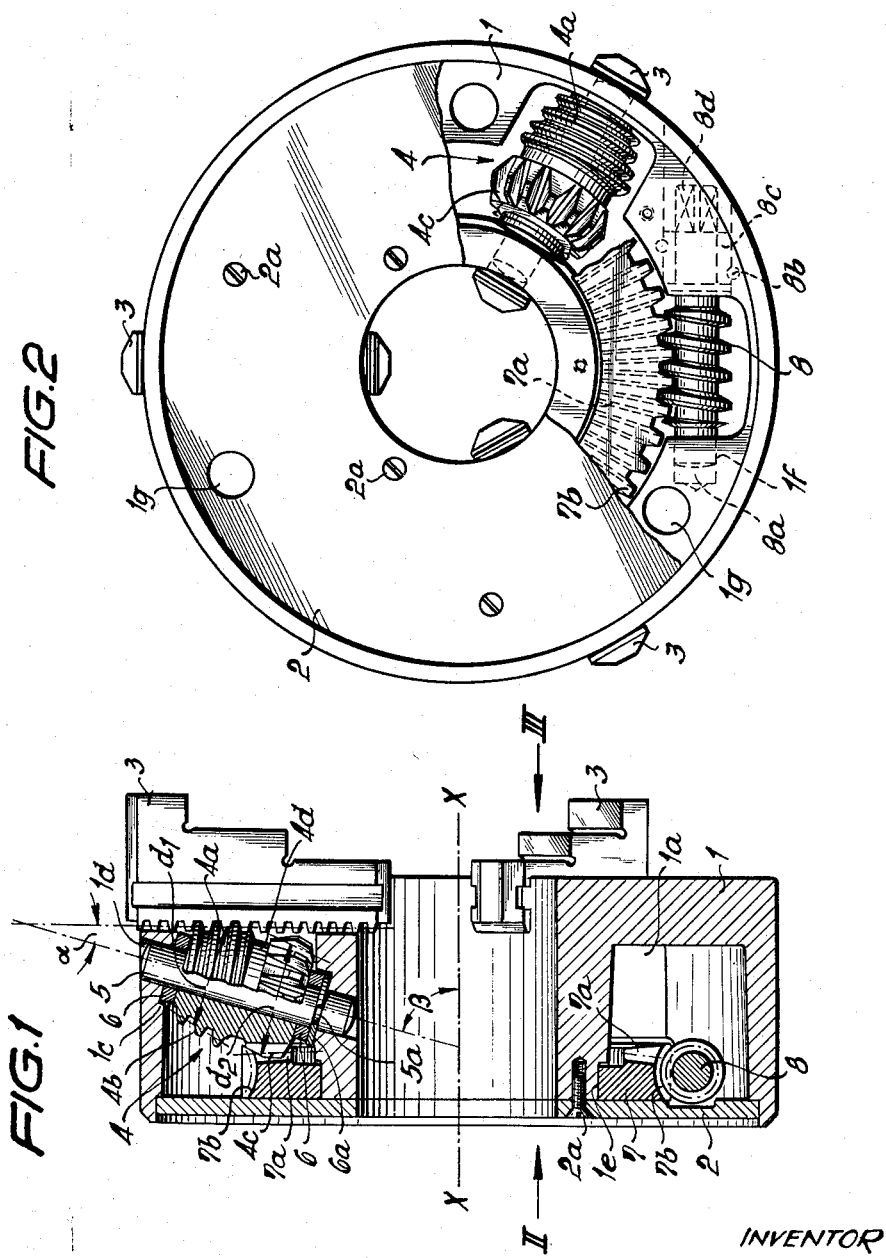

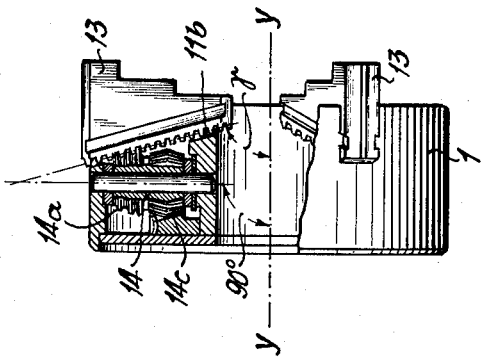
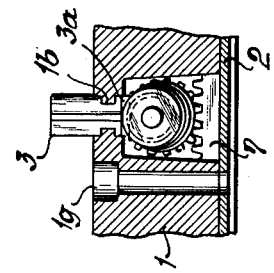
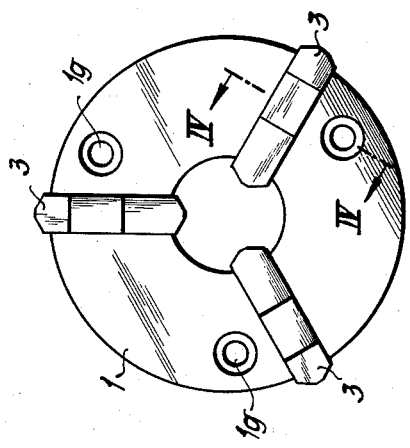

3,097,860
CHUCK FOR MACHINE TOOLS
Heribert Feldhoff, Heimgartenstrasse 7,
Dillingen (Danube), Germany
Filed May 8, 1961, Ser. No. 108,473
11 Claims. (Cl. 279—113)

The present invention relates to a chuck for machine tools, and particularly to a three-jaw chuck for lathes, although it is not limited to any particular number of clamping jaws.

In conventional chucks in which the clamping jaws are radially adjustable relative to the axis of the chuck, these jaws are shifted by means of flat-threaded helical gears, each of which together with a small bevel gear forms an intermediate gear unit, the axis of which extends at right angles to the main axis of the chuck. All of these gear units are turned simultaneously by a spur bevel gear. This spur bevel gear is also provided with worm gear teeth which mesh with the threads of a worm which has a square head at one end upon which a socket wrench may be fitted to permit the worm to be turned and thus all clamping jaws to be adjusted simultaneously by hand.

Due to the arrangement of two helical gears in series with each other, these known chucks produce a relatively strong clamping force which has even been increased by a compact construction, the use of ball bearings, and similar means. However, the modern development in the machining of metals, and especially the use of high-speed tools and the corresponding increase in cutting speed require chucks which are capable of producing still greater clamping forces and have a still greater resistance to wear under continuous loads than the chucks of the conventional design as described above which do not permit any further improvements in this respect.

It is an object of the present invention to provide a chuck for machine tools and especially for lathes which is capable of producing considerably greater clamping forces and has a much greater resistance to wear under continuous loads than the known chuck designs. The present invention is based upon the realization of the fact that the position of the intermediate gear unit parallel to the guide surfaces of the clamping jaws of the known chuck designs has the necessary result that the pitch diameter of the helical gear is considerably larger than the medium pitch diameter of the bevel gear of this intermediate gear unit. If, on the other hand, this were changed, the helical racklike teeth of these jaws which for reasons of stability have to be placed as closely as possible to the clamping surfaces of the jaws would interfere with the teeth of the bevel gear. The mentioned position of the intermediate gear unit has the further result that the tangential force which is to be transmitted from the bevel gear to the helical gear will be reduced which, in turn, means that the clamping force of the jaws will be reduced.

An essential feature of the present invention consists in modifying the mentioned chuck design in such a manner that the axes of the intermediate gear units are inclined at an acute angle to the guide surfaces of the clamping jaws. If these guide surfaces extend vertically to the axis of rotation of the chuck, the axes of the intermediate gear units are also inclined to the axis of the chuck at an angle of less than 90°. If, however, the guide surfaces of the clamping jaws are inclined at an acute angle to the chuck axis, the intermediate gear axes may either extend vertically to the chuck axis or be likewise inclined.

As a result of this arrangement, the helical gear of the intermedaite gear unit has a conical worm shape and it is now possible to reduce the medium pitch diameter of this worm in relation to the medium pitch diameter of the small bevel gear which is mounted on the same shaft and to make both gears of about the same pitch diameter or to make the pitch diameter of the worm smaller than that of the bevel gear. Even if the design of the new chuck is otherwise the same as that of the conventional chuck as described, the above-mentioned feature results in a considerable increase in the clamping force which is attainable by the clamping jaws. Comparison tests on actual models of the new chuck and on chucks of the known designs have shown that the clamping force of the new chucks is up to 100% greater than the clamping force attainable by the conventional chucks.

Another advantage which is attained by making the worm of the intermediate gear unit of a conical shape is the fact that both gears of this unit may be made integral with each other. By providing a relatively narrow annular groove between the two gears, it is then possible to produce the teeth of the bevel gear by broaching or by planing.

Another feature of the invention resides in bracing the intermediate gear unit so as to prevent a movement thereof in the axial direction by providing the opposite ends thereof with tempered thrust washers in which oil grooves are provided. Especially when using heavy-duty lubricants, such thrust washers are more capable of standing up under the high stresses occurring in a continuous operation than the ball bearings which have frequently been used in the chucks of prior designs. The fact that the chuck housing as well as the intermediate gear unit is made of a single piece of material facilitates the accurate assembly of the various components of the chuck and increases its stability especially when subjected to continuous stresses.

The above-mentioned as well as further objects, features, and advantages of the present invention will become more clearly apparent from the following detailed description thereof which is to be read with reference to the accompanying drawings, in which—

FIGURE 1 shows a cross section of a chuck according to the invention;

FIGURE 2 shows a rear view of the chuck according to FIGURE 1, as seen in the direction of the arrow II therein, and with parts of the chuck being broken away to reveal the inside thereof;

FIGURE 3 shows a front view of the chuck according to FIGURES 1 and 2 on a reduced scale, as seen in the direction of the arrow III in FIGURE 1;

FIGURE 4 shows a cross section taken along line A—B of FIGURE 3; while

FIGURE 5 shows a side view of a modification of the chuck, partly broken away and in cross section.

Referring to the drawings, and first particularly to FIGURES 1 to 4, the main body of the chuck consists of a steel housing 1 of an annular shape which is provided with an annular recess 1a so that each half of the housing has a substantially U-shaped cross section. The open side of housing 1 is closed by a cover 2 which is secured by a plurality of screws 2a. Otherwise, housing 1 forms an undivided one-piece element in order to insure that all movable parts of the chuck will remain in a fixed position relative to each other. The front wall of housing 1 is provided with radial guide surfaces 1b for receiving and guiding the clamping jaws 3 in a conventional manner. These guide surfaces 1b extend vertically to the axis X—X of the chuck and form apertures which extend entirely through the front wall of the housing so that the racklike helical teeth 3a of jaws 3 extend into the housing recess 1a where they mesh with a worm 4a which forms an integral part of an intermediate gear unit 4. The teeth 3e of jaws 3 are spaced as closely as possible from the guide surfaces 1b in order to insure an easy adjustment of the jaws and to prevent any binding thereof. These rack teeth 3a also extend along the entire length of each jaw 3 to permit the largest possible adjustment of the jaws. The shaft 5 of the intermediate gear unit 4 is inclined at an acute angle $\alpha$ to the direction of guide surfaces 1b, and the angle $\beta$ between the axis of shaft 5 and the axis x—x of the chuck is therefore also smaller than 90°. Preferred values of the angle $\alpha$ are 14° to 18° and of the angle $\beta$ 72° to 76°. As a result of this inclination of the axis of shaft 5, the thread 4b on worm 4a which engages with the rack teeth 3a is tapered and its cross-sectional shape is preferably trapezoidal. The worm thread 4b on each conical worm 4a may be produced substantially in the same manner as a normal cylindrical thread, except that the axis of the headstock and of the workpiece is inclined at the mentioned angle $\alpha$ relative to the direction of feed of the cutting tool and that the latter is fed in the usual manner at each revolution of the workpiece to the extent of the pitch in the direction of a generatrix of a cone. In the same manner it is also possible to produce a milling cutter which accurately corresponds to the screw thread of the conical worm 4a and which is used for milling the rack teeth of jaws 3. This results in a better transmission of forces and thus also in a better lubrication and lower friction between the teeth on jaws 3 and the screw threads on worms 4a than attainable with the cylindrical worms of conventional chucks. Gear unit 4 also has integrally thereon a small bevel gear 4c which is separated from the conical worm 4a by a shallow annular groove 4d which should have a width of such a size that an extension of the conical surface forming the bottom of each tooth space of bevel gear 4c will not intersect with the body of worm 4a. This permits the teeth of bevel gear 4c to be produced by broaching or planing.

The intermediate gear unit 4 is rotatably mounted on shaft 5 and supported at both ends of tempered thrust washers 6 which are provided with oil grooves and are inserted into inclined recesses 1c in housing 1. Shaft 5 is driven tightly into inclined bores 1d in housing 1 and is locked against shifting in the axial direction by a U-shaped lock washer 6a which engages into an annular groove 5a in shaft 5. The medium pitch diameter $d_1$ of worm 4a, as indicated by the arrows in FIGURE 1, is preferably equal to or smaller than the medium pitch diameter $d_2$ of bevel gear 4c.

Housing 1 is further provided in the inner wall of recess 1a with a further recess 1e in which a spur bevel gear 7 is mounted coaxially to the main axis x—x of the chuck. This gear 7 meshes with bevel gear 4c, and along its periphery it is provided with worm-gear teeth 7b which engage with the threads of a worm 8. Spur bevel gear 7 is preferably secured by the housing cover 2 against shifting in the axial direction. Worm 8 is mounted tangentially to worm gear 7b in bores 1f in housing 1 and it is prevented from shifting in the axial direction at one end by a bell socket 8a and near the other end by a bushing 8c which is secured by pins 8b. At this other end, worm 8 is provided with a square head 8d upon which a socket wrench may be applied.

Housing 1 and cover 2 are further provided with several bores 1g which extend parallel to the axis x—x of the chuck and are adapted to receive bolts for securing the entire chuck to the flange of the drive shaft of the machine tool. Cover 2 may, however, be also entirely omitted and be replaced by the flange of the drive shaft which then also serves for transmitting the torque and for closing the chuck housing 1. The chuck may also be connected to the drive shaft of the machine tool in any other suitable manner without departing from the scope of the invention.

In place of three clamping jaws it is obviously also possible to provide the chuck according to the invention with any other number of clamping jaws.

As previously indicated, the manner of preventing the intermediate gear unit 4 from moving in the axial direction by bracing its opposite ends by means of the tampered thrust washers 6 which are provided with oil grooves is superior to the use of the usual ball bearings, especially if heavy-duty lubricants are used, since such an arrangement will stand up better under the high stresses occurring in a continuous operation.

The chuck according to the invention may also be modified in the manner as illustrated in FIGURE 5 according to which the guide surfaces 11b of clamping jaws 13 are inclined at an angle $\gamma$ of less than 90° relative to the axis Y—Y of the chuck. The axis of the intermediate gear element 14 may then extend vertically to the axis Y—Y of the chuck, and worms 14a may likewise be conical and their medium diameter may be either equal to or smaller than that of bevel gears 14c. It is thus possible in the same manner as in the chuck according to FIGURES 1 to 4 to increase the clamping force considerably over that attainable by chucks of the conventional types.

It is, of course, also possible to incline not only the guide surfaces of the clamping jaws, but also the axes of the intermediate gear elements so as to extend at corresponding acute angles relative to the main axis of the chuck.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A chuck for machine tools comprising a substantially cylindrical housing having elongated, radially extending apertures in one end wall thereof forming guide surfaces, at least two clamping jaws having rack teeth thereon slidably mounted within said apertures and guided by said guide surfaces, a spur bevel gear rotatably mounted with and coaxially to said housing and also having peripheral worm gear teeth thereon, at least two intermediate gear units rotatably mounted within said housing and each comprising a conical worm meshing with said rack teeth on one of said jaws and a bevel gear meshing with said spur bevel gear, the axis of rotation of each of said gear units extending at an acute angle to said guide surfaces for each of said jaws, and a worm rotatably mounted within said housing and meshing with said worm gear teeth on said spur bevel gear.

2. A chuck as defined in claim 1, in which said guide surfaces for said clamping jaws extend vertically to the axis of said housing, each of said intermediate gear units having an axis extending at an angle of less than 90° to the axis of said housing.

3. A chuck as defined in claim 1, in which said conical worm and said bevel gear of each of said intermediate gear units are rigidly secured to each other and said conical worm has a medium pitch diameter substantially equal to the medium pitch diameter of said bevel gear.

4. A chuck as defined in claim 1, in which said conical worm and said bevel gear of each of said intermediate gear units are rigidly secured to each other and said conical worm has a medium pitch smaller than the medium pitch diameter of said bevel gear.

5. A chuck as defined in claim 1, in which said conical worm and said bevel gear of each of said gear units are integral with each other.

6. A chuck as defined in claim 1, in which said conical worm and said bevel gear of each of said gear units are integral with each other, each of said gear units having an annular groove intermediate said worm and said bevel gear, said groove having a width so that an imaginary extension of the bottom of each tooth space of said bevel gear does not intersect with the body of the adjacent conical worm.

7. A chuck as defined in claim 1, further comprising a tempered thrust washer at least on one end of said intermediate gear unit for preventing said gear unit from moving in the axial direction, said thrust washer having lubricating grooves therein.

8. A chuck as defined in claim 1, further comprising at least two shafts rigidly secured within said housing, each of said intermediate gear units being rotatably mounted on one of said shafts, each of said shafts having at least one annular groove near one end thereof, and a lock washer within said groove for securing said shaft in position relative to said housing.

9. A chuck for machine tools comprising a substantially cylindrical housing having one end wall and elongated, radially extending apertures in said end wall for forming guide surfaces, said housing consisting of a single one-piece element of an annular shape having an annular recess coaxially with said housing in the side opposite to said end wall, each half of said housing thus having a substantially U-shaped cross section, at least two clamping jaws having helical rack teeth thereon slidably mounted within said apertures and guided by said guide surfaces, a spur bevel gear rotatably mounted within and coaxially to said housing and also having peripheral worm gear teeth thereon, at least two intermediate gear units rotatably mounted within said housing and each comprising a conical worm meshing with said rack teeth on one of said jaws and a bevel gear integral with said conical worm and meshing with said spur bevel gear, the axis of rotation of each of said gear units extending at an acute angle to said guide surfaces for each of said jaws, and a worm rotatably mounted within said housing and meshing with said worm gear teeth on said spur bevel gear, and means on said last worm for turning the same about its axis and for thereby rotating said gear units simultaneosuly about their axes and for moving said clamping jaws simultaneously and equally in radial directions.

10. A chuck as defined in claim 9, in which the side of said housing opposite to said end wall is open, and a cover secured to said housing for closing said open side, said cover engaging upon said spur bevel gear to maintain the same in position within said housing.

11. A chuck as defined in claim 9, in which the side of said housing opposite to said end wall is open, and means for securing said housing to a shaft of a machine tool having a flange so that said flange will close said open side of said housing and thereby also engage upon said spur bevel gear to maintain the same in position within said housing.

References Cited in the file of this patent

UNITED STATES PATENTS 1,814,699     Hubbell _____ July 14, 1931

FOREIGN PATENTS 1,012,951     France _____ Apr. 23, 1952